(12) United States Patent
Miyata

(10) Patent No.: US 6,787,945 B2
(45) Date of Patent: Sep. 7, 2004

(54) LINEAR MOTOR

(75) Inventor: Koji Miyata, Fukui (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/385,644

(22) Filed: Mar. 12, 2003

(65) Prior Publication Data

US 2003/0234584 A1 Dec. 25, 2003

(30) Foreign Application Priority Data

Mar. 13, 2002 (JP) ........................................ 2002-069298

(51) Int. Cl.$^7$ .............................................. H02K 41/02
(52) U.S. Cl. ..................... 310/12; 310/154.01; 310/266
(58) Field of Search ............................ 310/12–15, 154, 310/266; 318/135

(56) References Cited

U.S. PATENT DOCUMENTS

| | | | |
|---|---|---|---|
| 3,743,870 A | * 7/1973 | Hunt ............................. | 310/13 |
| 4,318,038 A | * 3/1982 | Munehiro .................... | 318/135 |
| 4,369,383 A | 1/1983 | Langley | |
| 4,546,277 A | * 10/1985 | Carbonneau et al. ......... | 310/13 |
| 4,667,139 A | * 5/1987 | Hirai et al. .................. | 318/687 |
| 4,758,750 A | * 7/1988 | Itagaki et al. ................. | 310/13 |
| 4,868,431 A | 9/1989 | Karita et al. | |
| 5,801,462 A | * 9/1998 | Yagoto et al. ................ | 310/12 |
| 5,808,382 A | 9/1998 | Ira et al. | |
| 5,949,161 A | * 9/1999 | Nanba .......................... | 310/12 |
| 5,959,374 A | * 9/1999 | Anderson et al. ............. | 310/13 |
| 5,990,583 A | * 11/1999 | Nanba et al. ................. | 310/12 |
| 6,064,128 A | * 5/2000 | Yagoto et al. ................ | 310/12 |
| 2002/0021050 A1 | 2/2002 | Fujisawa et al. | |

FOREIGN PATENT DOCUMENTS

| | | | |
|---|---|---|---|
| EP | 0 792 005 A1 | 8/1997 | |
| GB | 2274551 | * 7/1994 | .......... H02K/41/03 |
| JP | 59-86471 A | 5/1984 | |
| JP | 10-52025 A | 2/1998 | |
| JP | 10-225084 | * 8/1998 | .......... H02K/41/03 |
| JP | 10-257750 A | 9/1998 | |
| JP | 2000-14120 A | 1/2000 | |

* cited by examiner

*Primary Examiner*—Burton Mullins
(74) *Attorney, Agent, or Firm*—Sughrue Mion, PLLC

(57) ABSTRACT

In order to precisely install a permanent magnet linear motor on a machine tool without being influenced by magnetic fields, a stator is provided with a magnet support which extends in parallel with the lengthwise direction of the linear motor and whose cross section perpendicular to the lengthwise direction of the linear motor is polygon or circular. The stator further comprises a plurality of permanent magnet arrays mounted on the outer surface of the magnet support in parallel with the lengthwise direct of the linear motor. The stator is held at both ends thereof by stator supports. On the other hand, a movable body has a hollow member extending in parallel with the lengthwise direction of the linear motor and surrounding part of the stator. Further, the movable body is provided with a plurality of armature modules each of which comprises an armature core and armature coils mounted thereon. The plurality of armature modules are mounted on the inner surfaces of the hollow member such that the lengthwise axes thereof are in parallel with the lengthwise direction of the linear motor and such that the armature modules respectively face the permanent magnet arrays with an air gap therebetween.

3 Claims, 8 Drawing Sheets

WINDING DIRECTION OF ARMATURE COIL

LINEAR MOTOR

BACKGROUND OF THE INVENTION

1. Field of the Invention

The present invention relates generally to a linear motor, and more specifically to a permanent magnet type linear motor for use in a machine tool or the like.

2. Description of Relate Art

Prior to turning to the present invention, it would be preferable to describe, with reference to FIGS. 6(A) to 6(C) and FIGS. 7 and 8, a conventional linear motor which is pertinent to the present invention. FIG. 6(A) is a side elevation of a linear motor (generally denoted by reference number 8), and FIG. 6(8) is a cross section taken along a section line A–B of FIG. 6(A).

As shown FIG. 6(A), the linear motor 8 generally comprises a stator 10 and a movable body 12. The movable body 12 is positioned apart from the stator 10 leaving an air gap therebetween so as to be movable with respect thereto. The stator 10 is comprised of a plurality of permanent magnets 14, each of which is rectangular in this case and has a lengthwise axis in the direction normal to the drawing of FIG. 6(A). The magnets 14 are arms in an equally spaced manner on a plate-like iron base (support) 16. The polarities of the magnets 14 are such as to change alternately in the moving direction of the movable body 12 (viz., in the horizontal direction in the drawing). Each of the arrows attached to the permanent magnets 14 indicates the magnetized direction of the corresponding magnet. On the other hand, the moving body 12 comprises an armature core 18 of magnetic material and a plurality of armature coils 20 respectively wound around the teeth (or leg-like projections) 22 of the core 18.

The armature coils 20 are concentratedly wound around the teeth 22 of the core 18, respectively, and coupled so as to take the form of balanced three-phase circuit, wherein the three phases are respectively denoted by U, V, and W. The balanced three-phase circuit or connection per se is well known in the art, and thus the further description will be omitted for simplifying the instant disclosure.

In the linear motor 8 shown in FIG. 6(A), the eight permanent magnets 14 are arranged such as to oppose nine teeth 22 of the armature core 18. Arrows shown in FIG. 6(B) schematically indicate the winding directions of the armature coils 20 provided around the teeth 22. The nine coils 20 produce eight magnetic fields between the adjacent teeth. As is known in the art, when the phases of the currents flowing through the coils 20 are controlled, the moving body 12, which is held by a suitable support (not shot), moves linearly above the stator 10.

The number of the teeth 22 and the number of the permanent magnets 14 opposing them, are not limited to the above-mentioned ones. By way of example, FIG. 6(C) shown one example wherein the nine teeth 22 of the armature core 18 are arranged such as to face the six permanent magnets 14, in the case of which the coils 20 carried by the nine teeth 22 are supplied with the U-, V- and W-phase currents so as to generate six magnetic fields at the side of the magnets 14.

FIGS. 7(A) and 7(B) schematically illustrate the manner wherein the linear motor 8 of FIG. 6(A) is installed in a machine tool 30 (only part thereof is illustrated). FIG. 7(A) is a front elevation of the linear motor 8 together with the part of the machine tool 30 as viewed in the direction of the movement of the movable body 12. FIG. 7(B) is a schematic side elevation of the linear motor 8 and part of the stator 10 of FIG. 7(A) as viewed in the direction perpendicular to the movement of the movable body 12.

As shown in FIG. 7(A), the movable body 12 is fixed to the lower side of a table 32 which is provided with linear guides 34a and 34b extending in the direction of the movement of the movable body 12. The stator 10 has been mounted on a plate-like bottom member 36 of the machine tool 30. The machine tool 30 is further equipped with two side members 38a and 38b which stand vertically at the opposite ends of the bottom member 36. The machine tool 30 is still further equipped with two linear guides 40a and 40b on the tops of the side members 38a and 38b, respectively. The above-mentioned guides 34a and 34b, which are fired to the lower side of the table 32, are slidably mounted on the liner guides 40a and 40b when the movable body 12 has been assembled with the stator 10.

At the final stage of assembly of the linear motor 8 as shown in FIGS. 7(A) and 7(B), the table 32 accompanying the movable body 12 is lowered as shown by arrows 42a and 42b. Thus, the armature core 22 of magnetic material approaches the permanent magnets 14 with the result in occurrence of an extremely large amount of magnetic attraction force imparted on the magnetic core 18 as indicated by a broad open arrow 44. Accordingly, in order to precisely position the movable body 12 on the stator 10 against such a large magnetic force, it is inevitable to prepare a jig (typically rigid and bulk which is dedicated to the assembly itself. However, it is practically difficult to settle such jig on or in the vicinity of the machine tool 30 due to a limited working space. In the case where a suitable jig is unable to prepare for the assembly of the linear motor 8 FIG. 6(A)), the above-mention prior art has encountered the problem that it needs a fairly long time until completing the assembly of the linear motor 8, in addition to which it is not typically expected to precisely mount the movable body 12 onto the stator 10, leading to the fact that the designed performances or characteristics of the machine tool 30 is not expected.

FIGS. 8(A) and 8(B), which respectively correspond to FIGS. 7(A) and 7(B), schematically illustrate that the linear motor a has been assembled on the machine tool 30. When the linear motor 8 has been assembled, the armature core 18 is in close proximity to the permanent magnets 14, and as such, the magnetic attraction force imparted on the core 18 is very large, which is approximately several times the nominal (rated) driving force of the linear motor 8 (for example). As a result, the frictions between the guide rails 34a and 40a and also between the guide rails 34b and 40b are large to a considerable extent, and thus, such a large friction may result in decrease in the life time of the guides 34a–34b and 40a–40b. In order to overcome this problem, it is conceivable to increase the contact area between the linear guides, which, however, may arise another difficulties that the movable portion undesirably increases in weight and thus the acceleration of the movable body 12 is lowered.

One approach to overcoming the above-mentioned problems is disclosed in Japanese Laid-open Patent Application No. 10-257750, according to which a two opposing stators are provided between which a movable body is arranged to linearly move. In this case, the two magnetic attraction forces exerted on the two stators are cancelled, and thus, it is possible to reduce the friction between the liner guides of the stators and the movable body. However, the prior art disclosed in Japanese laid-open Patent Application is still encountered the problem that it is not easy to assemble the bear mortar. That is to say, according to this prior art, the two stators are firstly provided on the lower (bottom) frame of a machine tool as in the first prior art (FIG. 2(A)), after which the movable body, which has been fixed on the lower surface of a table, is lowered toward the space between the two stators. As mentioned above, the magnetic attraction force is very large and thus it is absolutely necessary to prepare a mechanism dedicated to the linear motor assembly as in the first prior art, which results in the same difficulty with the first prior art.

Therefore, in case the linear motor is assembled without use of such an assembly-assisting mechanism, it needs a quite long time until finishing the assembly on the machine tool due to strong magnetic attractions, and in this instance, it is usually not expected to precisely assemble the linear motor. Accordingly, it is often the case that the movable body is liable to be misaligned, resulting in the fact that the air gap between the stator and the opposing magnets is unable to be uniformly maintained. As a result, it is high liable to under induce cogging forces which lead to uneven driving forces.

SUMMARY OF THE INVENTION

It is therefore an object of the present invention to provide a linear motor which can be accurately assembled onto a machine tool in a short time period.

Another object of the present invention is to provide a linear motor which, once installed on a machine tool is able to considerably reduce the frictions between the engaged linear guides and also able to reduce cogging forces to a considerable extent.

One aspect of the present invention resides in a linear motor comprising; a stator having a magnet support which extends in parallel with the lengthwise direction of the linear motor and whose cross section perpendicular to the lengthwise direction of the linear motor is polygon or circular, the stator further having a plurality of permanent magnet arrays mounted on the outer surface of the magnet support in parallel with the lengthwise direction of the linear motor, the suitor being held at both ends thereof by stator supports; and a movable body having a hollow member extending in parallel with the length direction of the linear motor and surrounding part of the stator, and having a plurality of armature modules each of which comprises an armature core and armature coils mounted thereon, the plurality of armature modules being mounted on the inner surfaces of the hollow member such that the lengthwise axes thereof are in parallel with the lengthwise direction of the linear motor and such that the armature modules respectively face the permanent magnet arrays with an air gap therebetween.

BRIEF DESCRIPTION OF THE DRAWINGS

The features and advantages of the present invention will become more clearly appreciated from the following description taken in conjunction with the accompanying drawing in which like elements or portions are denoted by like reference numerals and in which.

DETAILED DESCRIPTION OF THE PREFERRED EMBODIMENTS

Figure 1A:
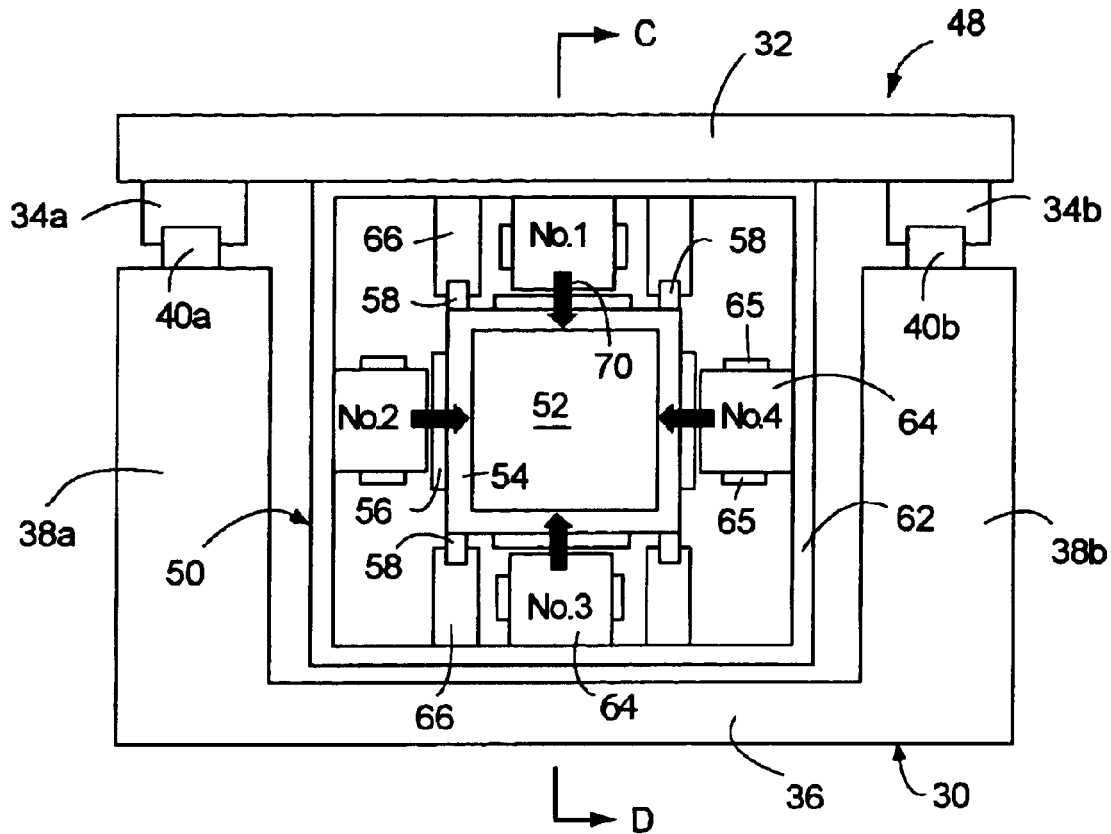
FIG. 1(A) is a sectional view of a linear motor according to an embodiment of the present invention, which linear motor is installed in a machine tool.

Preferred embodiments of the present invention will be described with reference to FIGS. 1(A) to 5. In the following, the portions or members, which are identical to or correspond to those of the prior art referred to in the opening are denoted by like reference numerals. Further, all like elements or portions may not be denoted by reference numerals for the sake of simplifying the draw.

Figure 1B:
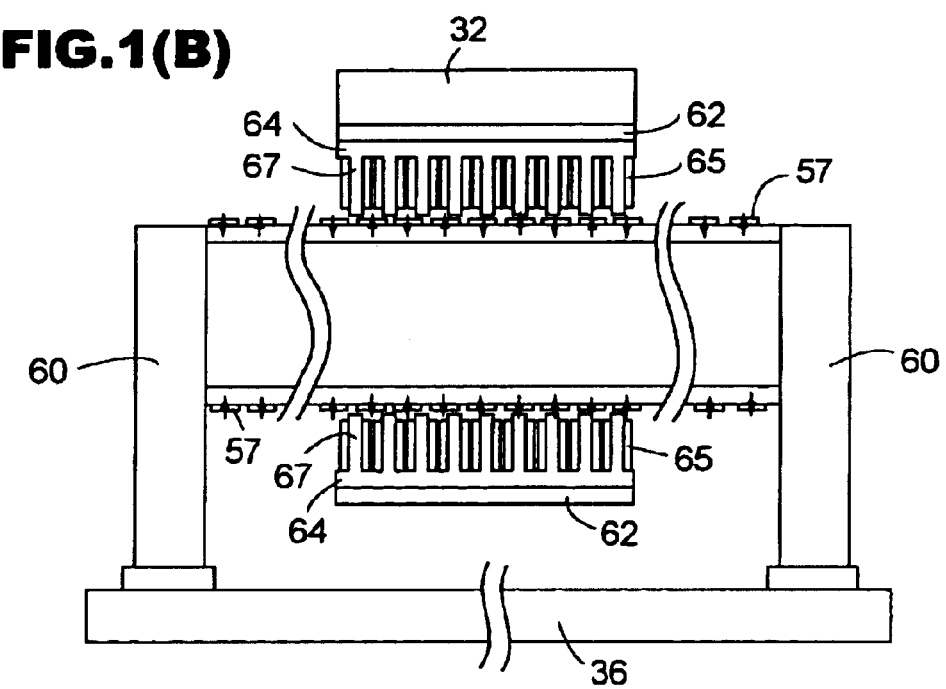
FIG. 1(B) is a sectional view t along section line C–D of FIG. 1(A)
Figure 7A:
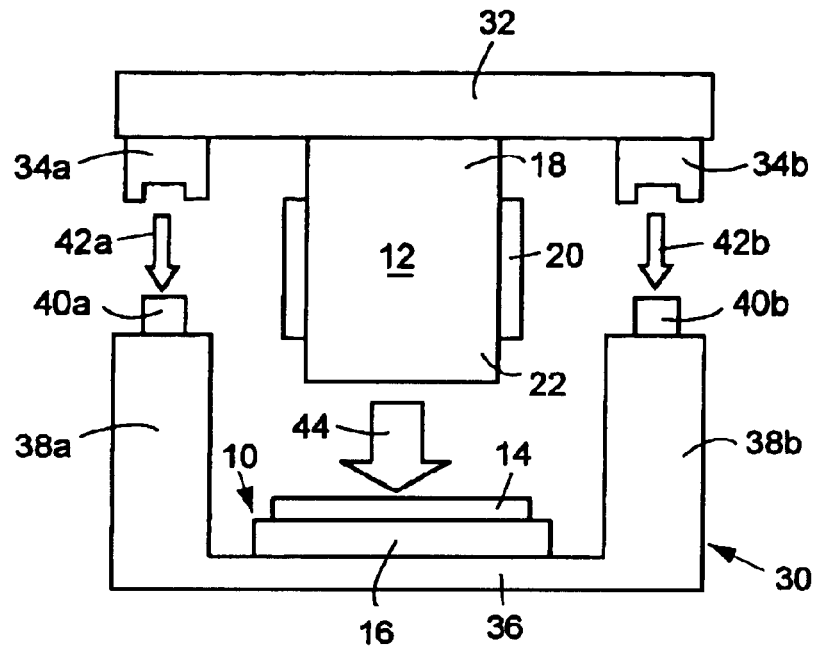
FIG. 7(A) is a sectional view schematically showing a conventional linear motor which is lowered so as to be installed in a machine tool.
Figure 7B:
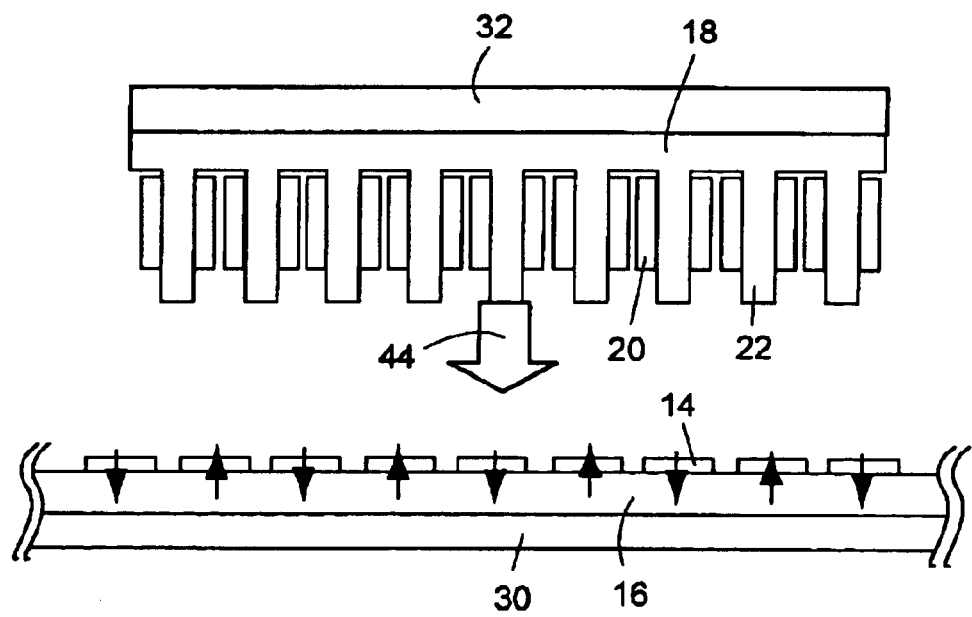
FIG. 7(B) is a section view of the linear motor shown in FIG. 7(A)
Figure 8A:
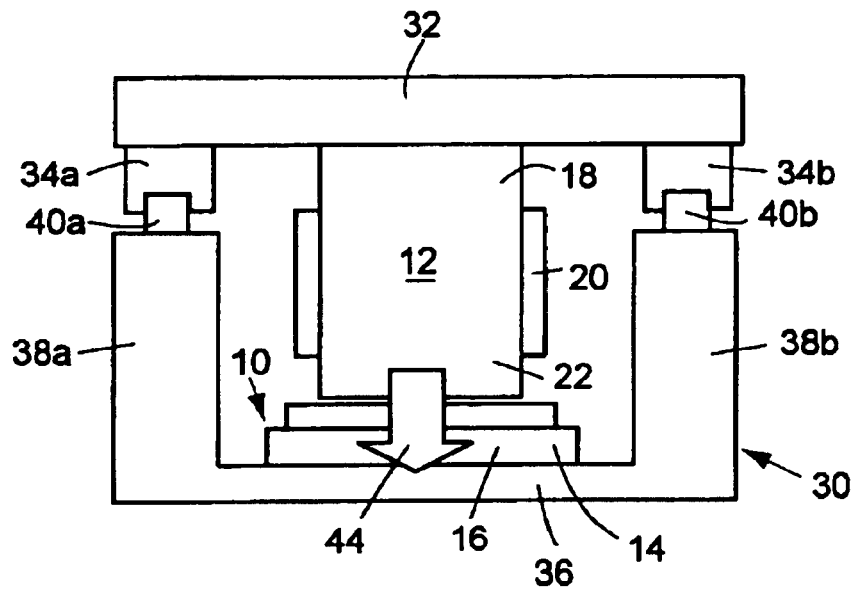
FIG. 8(A) is a sectional view schematically showing the conventional linear motor of FIG. 7(A) which has been installed in the machine tool.
Figure 8B:
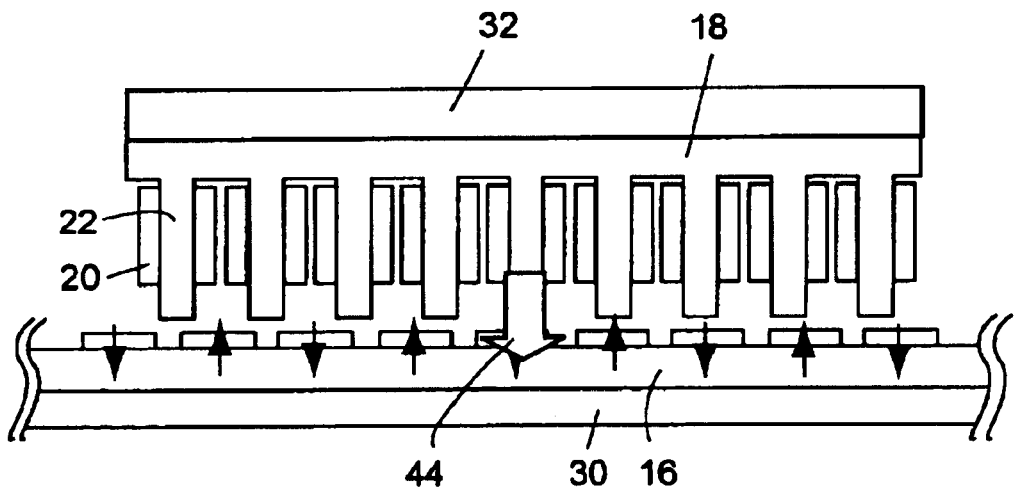
FIG. 8(B) is a sectional view of the linear motor shown in FIG. 8(A).

FIG. 1(A) is a sectional view schematically showing a linear motor (generally denoted by 48) according to a preferred embodiment of the present invention, together with part of the machine tool 30 referred to in FIG. 7(A), as viewed from the direction along which a movable body 50 is linearly driven (viz., as viewed from the lengthwise direction of the linear motor 48). The linear motor 48 shown in FIG. 1(A) has been already installed in the machine tool 30. FIG. 1(B) is a sectional view of the linear motor 48 and part of the machine tool 30 taken along section line C–D of FIG. 1(A).

As shown in FIGS. 1(A) and 1(B), as stator 52 is comprised of a pipe 54 whose cross section perpendicular to the lengthwise direction of the linear motor 48 is substantially square in this particular case. The stator 52 further comprises a plurality of permanent magnet arrays 56 mounted on the four outer surfaces of the pipe (viz., hollow square member) 54. Each magnet array 56 is comprised of a plurality of permanent magnets 57 (see FIG. 1(B) which are equally spaced with each other, and the magnetized directions of the magnets 57 change alternately in the direction of driving the movable body 50 as in the prior art. Still further, the stator 52 is provided with two pairs of linear guides 58 on the upper and lower outer surfaces of the square pipe 54. The stator 52 is firmly held at the both ends thereof by means of suitable supports 60 (see FIG. 1(B)).

The movable body 50 comprises a square pipe (viz., hollow square member) 62 which is fit attached to the lower surface of the table 32. The square pipe 62 is equipped with four armature cores 64, each of which is made of magnetic material and fixed to the inner walls of the tube 62 and which respectively face the corresponding magnetic arrays 56 leaving an air gap therebetween. Coils 65 are respectively wound around the corresponding teeth 67 of each of the four armature cores 64 as in the prior art. In addition, the movable body 50 comprises two pars of linear guides 66, which at respectively fixed to the upper and lower inner walls of the square pipe 62 and which are slidably with the corresponding linear guides 58, as schematically illustrated in FIG. 1(A).

A combination of one armature core 64 and the coils 64 provided thereon will be referred to as an armature module (or simply "module") for the sake of convenience of description, and the four modules in total are respectively denoted by No. 1 to No. 4. The modules No. 1 to No. 4 are identical in configuration with each other.

The directions of the magnetic attraction forces, which are imparted on the modules No. 1 to No. 4, are indicated by four arrows 70 in FIG. 1(A). It is understood that the magnetic attraction forces in the vertical direction (in the figure) are respectively canceled, and in the same manner, those in the horizontal direction are also canceled. Accordingly, the forces exerted on the linear guides 58 provided on the upper and lower surfaces of the square pipe 54 can be reduced to a considerable extent, which implies that it is not necessary to strongly build the guides 58. In other words, especially, the upper linear guides 54 are sufficient in terms of rigidity if they can support the weights of the table 32, the movable body 50, the guides 34a and 34b, etc. That is to say, it is no longer necessary to consider the influences of the permanent magnetic forces as in the prior art. In addition, the same discussion is applicable to the guides 66, 34a–34b, and 40a–40b.

Figure 2:
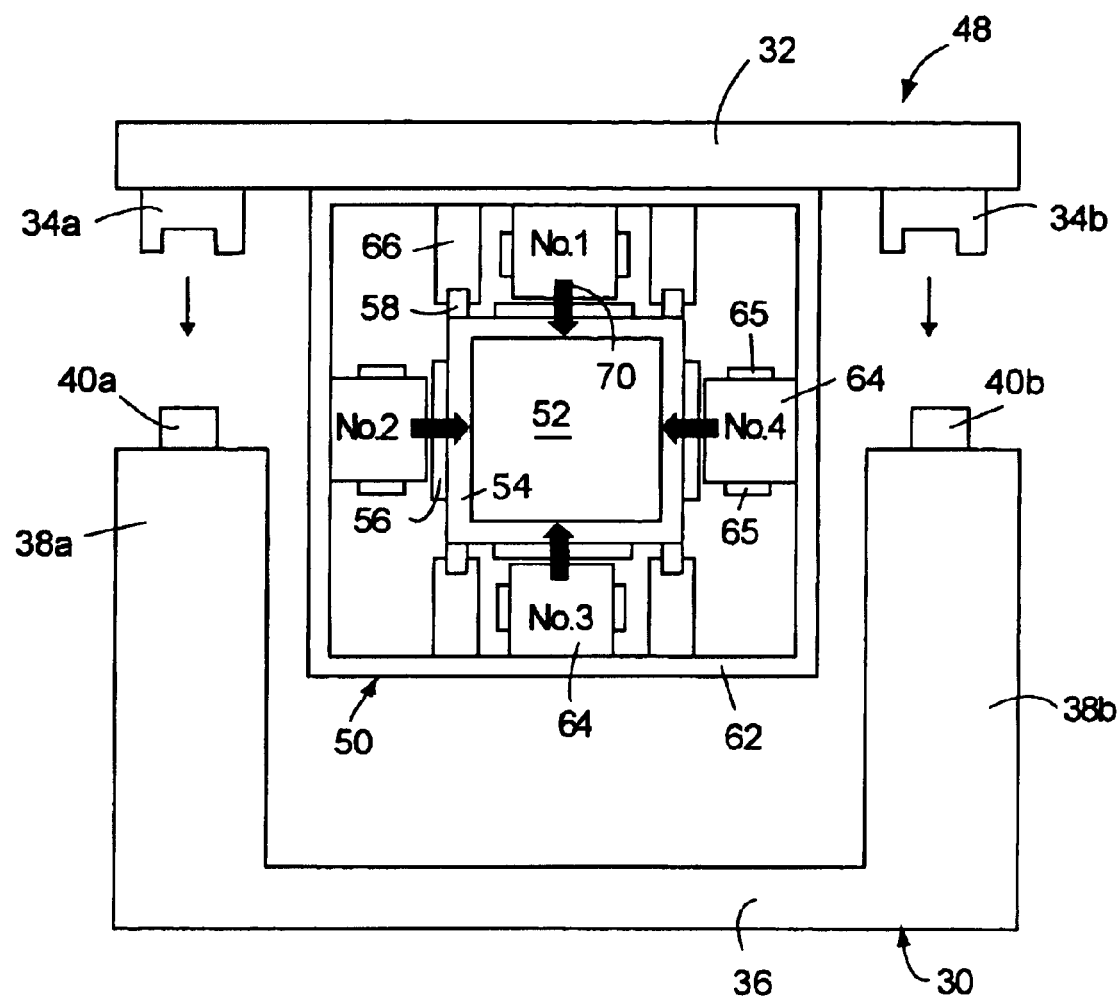
FIG. 2 is a diagram schematically showing the linear motor of FIGS. 1(A) and 1(B) installed in a machine tool.

Reference is made to FIG. 2, which corresponds to FIG. 1(A) and schematically illustrates a manner of assembling the liner motor 48 onto the machine tool 30.

Before the linear motor 48 is installed onto the mine tool 30 as shown in FIG. 2, the modules No. 1 to No. 4 are mounted on the inner walls of the square pipe 62 of the movable body 50. The table 32 is attached to the spare pipe 62 after or before the above-mentioned mounting of the modules No. 1 to No. 4. It is to be noted that the mounting of the modules No. 1 to No. 4 on the inner walls of the tube 62 can be done without any difficulty in that no magnetic fields exit at this working step. Thereafter, the stator 52 is seared into the space which is defined by the modules No. 1 to No. 4. In this case, as mentioned above, the magnetic attraction forces imparted on the opposite magnetic cores 64 of the modules No. 1 to No. 4 are effectively cancelled, and accordingly it is not difficult to insert the stator 52 into the predetermined space within the square tube 62. Subsequently, the supports 60 are fixed to the both ends of the stator 52. The above-mentioned assembly of the linear motor 48 can be implemented at an ample space away from the machine tool 30 or an appropriate workshop, and hence, it is possible to address the aforesaid problem of preparing a rigid assemble gear dedicated to the assembly and settling the same on a limited space on the machine tool 30.

As shown in FIG. 2, the linear motor 48, which is attached to the lower surface of the table 32, is lowered toward the machine tool 30 using an appropriate instrument such as a crane or the like. In this instance, the magnetic forces may exist between the linear motor 48 and each of the vertical frames 38a and 38b of the machine tool 30. However, the magnetic attraction forces exerted on the vertical frames 38a and 38b are opposite in direction and am small relative to the those indicated by arrows 70, and accordingly, the linear motor 48 can precisely be assembled to the machine tool 30 without difficulty. When the linear motor 48 is settled on the machine tool 30 by engine the linear guides 34a and 34b with the counterparts 40a and 40b, the supports 60 we then fixed to the bottom frame 36 of the machine tool 30 as shown in FIG. 1(B).

Figure 3:
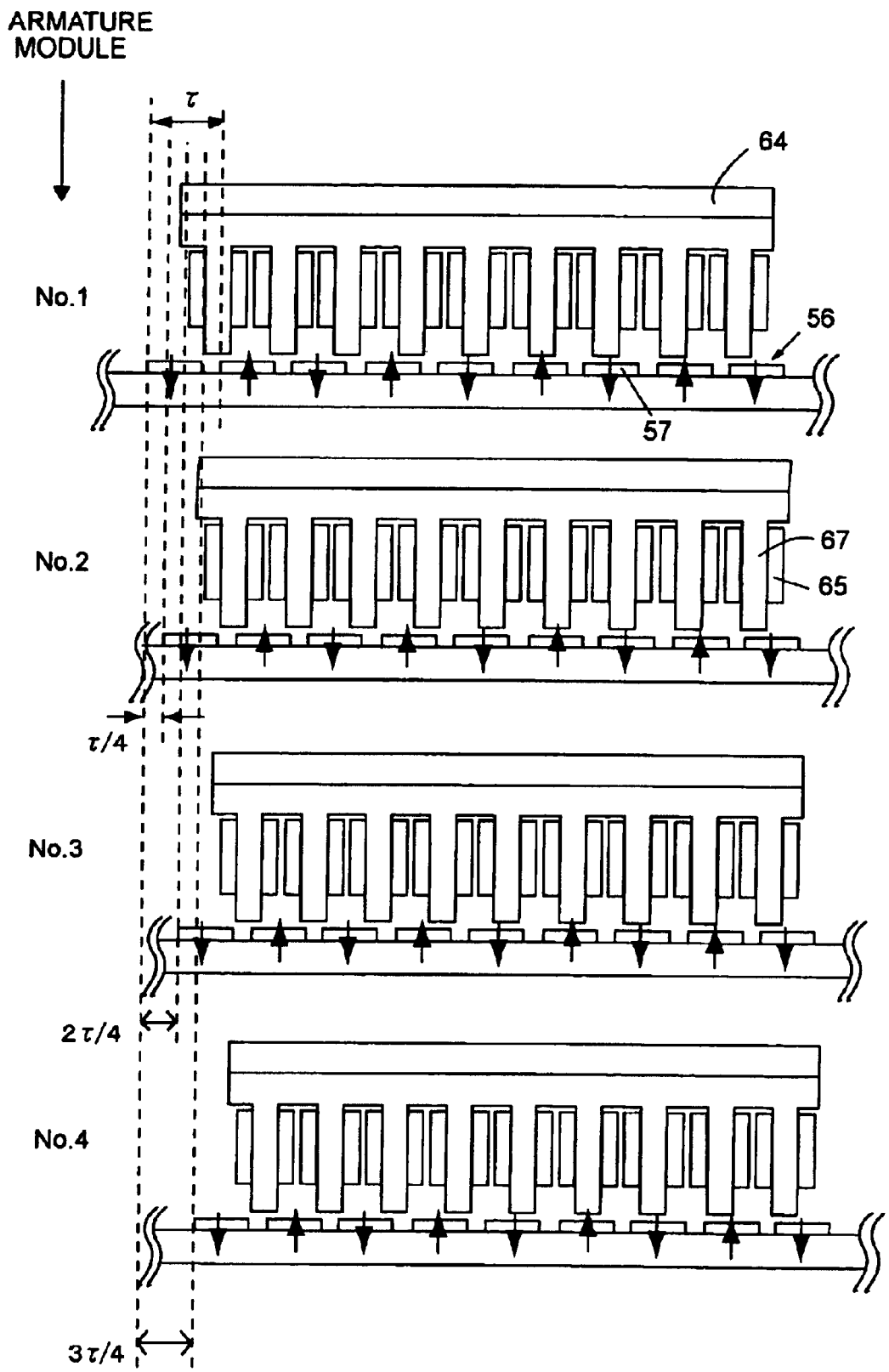
FIG. 3 is a dial schematically showing displacements of magnetic cores and magnetic array of FIGS. 1(A) and 1(B)
Figure 4:
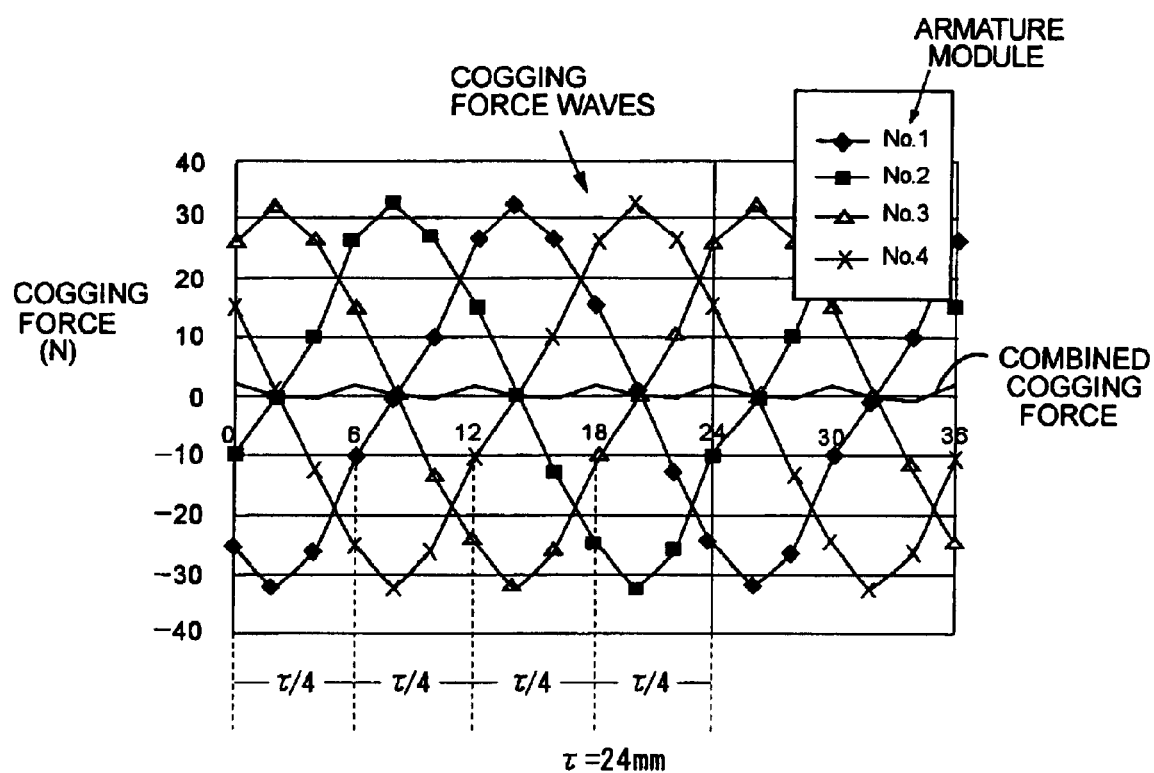
FIG. 4 is a graph showing the waves of cogging forces (torques) of four armature modules together with the wave of a combined cogging force when displacing the magnetic cores and the magnetic arrays as shown in FIG. 3.

The embodiment will further be described so as to discuss, with reference to FIGS. 3 and 4, another feature thereof via which the cogging torques (forces) can effectively be reduced with the structure mentioned above.

Figure 6A:
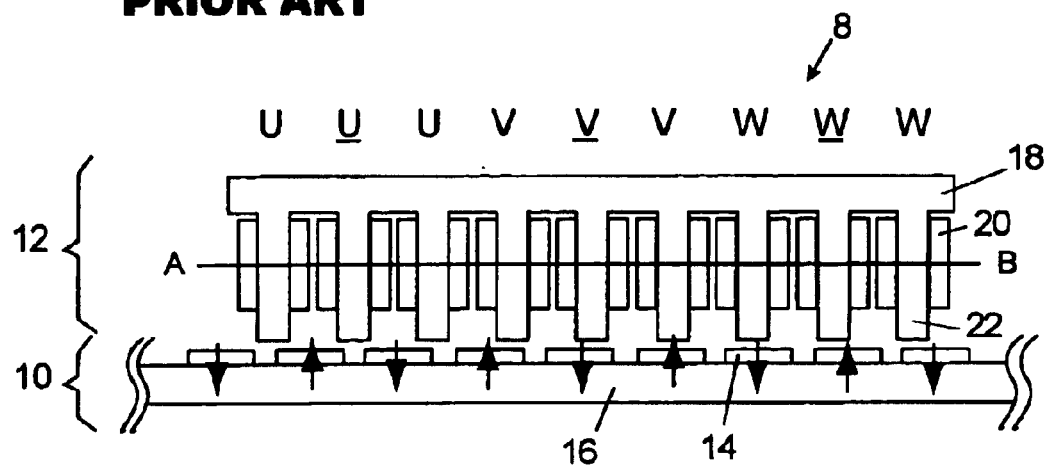
FIGS. 6(A) to 6(C) are each being a sectional view schematically showing an armature core and a magnetic array for describing prior art which is pertinent to the present invention.
Figure 6B:
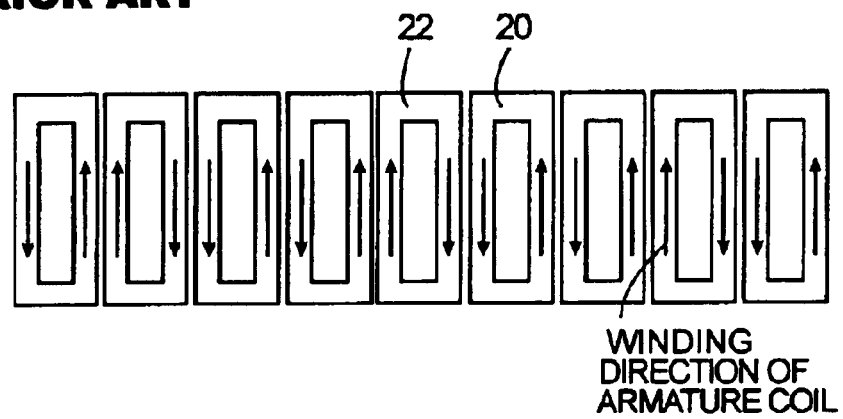
Figure 6C:
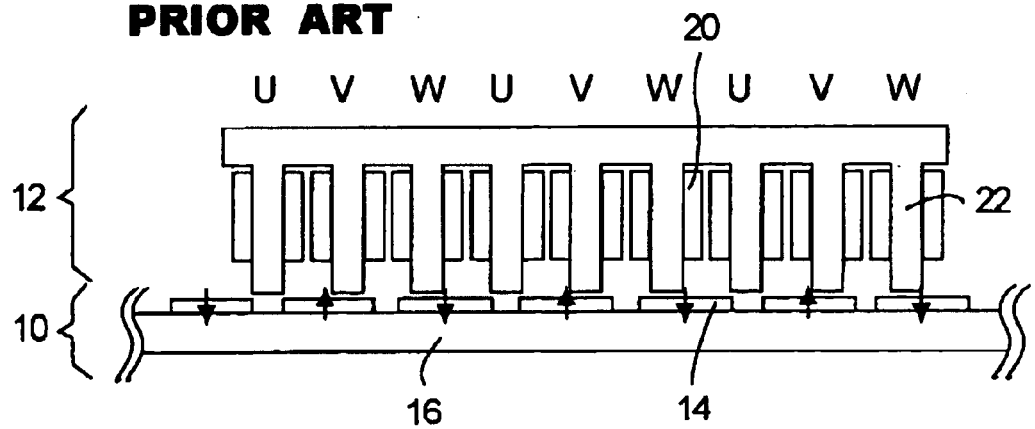

FIG. 3 is a drawing schematically showing relative positions of the four armature cores 64 and also relative positions of the permanent magnet arrays 56 so as to reduce the cogging forces of the linear motor as mentioned later. As shown in FIG. 3, it is assumed that the linear motor is confided such that the eight permanent magnets face the nine teeth 67 of the armature core 64 as in the case of FIG. 6(A). Designating the pitch of the permanent magnets 57 by τ, each of the armature cores 64 is displaced by τ/4 with respect to the adjacent ones in the direction of driving the movable body 50. In a similar manner, each of the magnet arrays 56 is displaced by τ/4 with respect to the adjacent magnet arrays in the direction of driving the movable body 50.

The displacement of the armature cores 64 and the magnetic arrays 56 is not limited to τ/4, and in general, it is sufficient if the displacement is a natural number multiple of τ/4.

In the above, it can be said that each of the modules No. 1 to No. 4 instead of the armature cores is displaced with each other.

FIG. 4 is a diagram which schematically shows the waves of four cogging forces generated at the four modules No. 1 to No. 4 together with the wave of the combined cogging force in the case where the armature cores 64 and the magnetic arrays 56 are displaced as shown in FIG. 3. In this case, it is assumed that a pitch τ of the permanent magnets of each magnet arrays is 24 mm. As shown in FIG. 4, although each of the cogging forces is as large as about 32N, the cogging force are canceled with each other, resulting in the fact that the combined cogging force can be lowered as low as approximately 2N.

Figure 5:
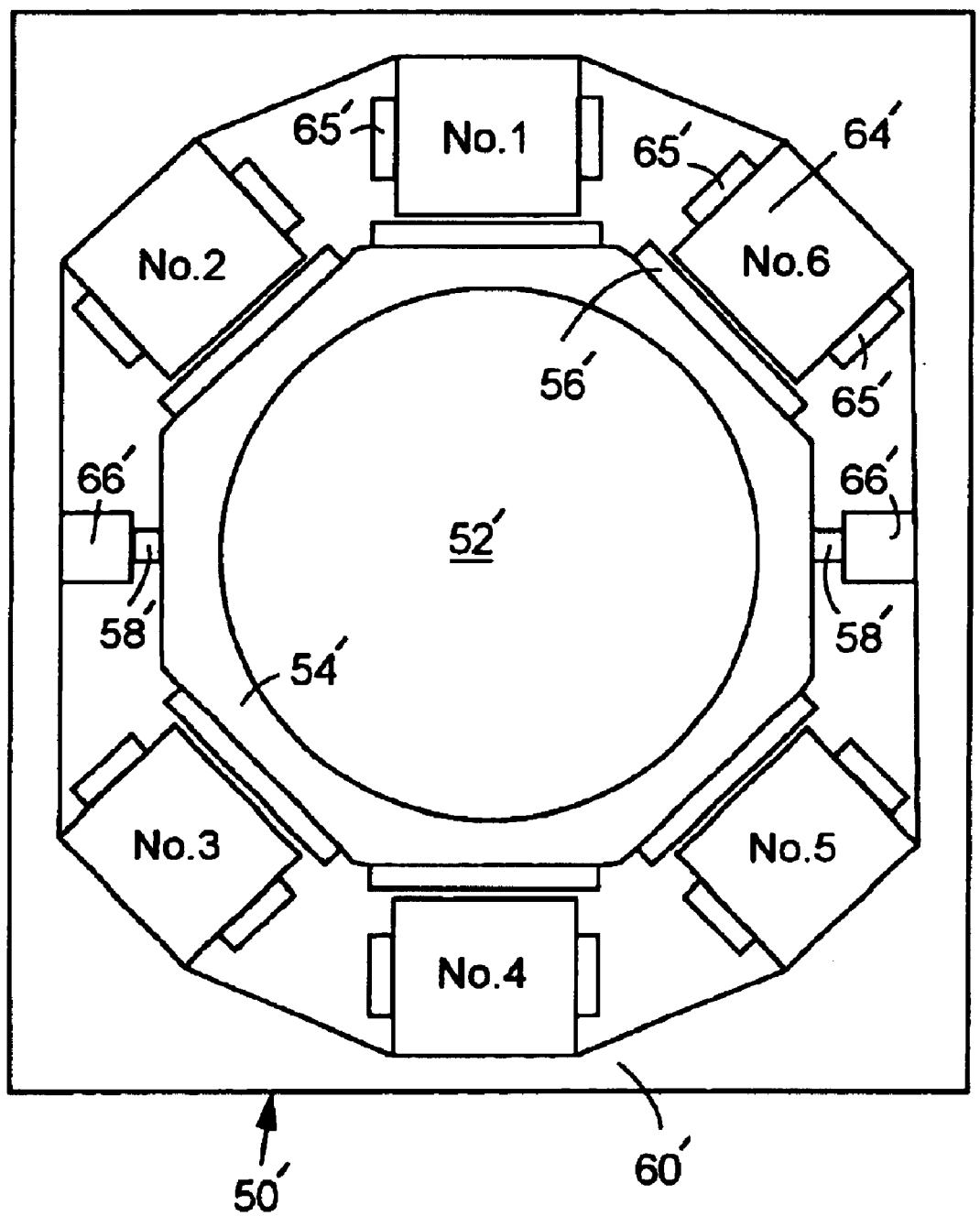
FIG. 5 illustrates schematically a variant of the embodiment shown in FIGS. 1(A) to 4.

In the above-mentioned embodiment, the stator 52 is provided with the square tube 54 on which the four magnet arrays 56 are mounted such as to face the four modules No. 1 to No. 4 of the movable body 50. That is, the linear motor 48 is provided with the four pairs or combinations of the magnet arrays and the modules. However, it is within the scope of the present invention to provide more than four pairs of the magnet arrays and the modules. By way of example, FIG. 5 illustrates one variation of the aforesaid embodiment wherein six pairs of the magnet arrays and the modules (denoted by No. 1 to No. 6) are provided. In FIG. 5, each of the elements or portions corresponding to those of the aforesaid embodiment is denoted by like reference numeral plus a prime. As shown in FIG. 5, a stator 52' comprises a frame member 54' which corresponds to the square tube 54. The member 54' has eight surfaces among which the six surfaces are used to mount thereon the permanent magnets 56' and the two surfaces are utilized to provide two linear guides 58'. On the other hand, a movable body 50' is comprised of a frame 62' whose inner surface is configured so as to mount thereon the six modules No. 1 to No. 6 and two linear guides 66'. It is understood that if more than four pairs of magnet arrays and modules should be provided in a linear motor, the cross section of the frame member 54' for mounting the magnet arrays thereon may be polygon. As an alterative, the frame member 54' is able to take the form of the hollow circular member on the condition that the magnetic arrays are shaped so as to be mounted on the cylindrical surface.

The foregoing descriptions show one preferred embodiment and one modification thereof. However, other various modifications are apparent to those skilled in the art without departing from the scope of the present invention which is only limited by the appended claims. Therefore, the embodiment and modification shown and described are only illustrated, not restrictive.

What is claimed is:

1. A linear motor comprising:

a stator having a magnet support which extends in parallel with the lengthwise direction of the linear motor and whose cross section perpendicular to the lengthwise direction of the linear motor is polygon or circular, said stator further having a plurality of permanent magnet arrays mounted on the outer surface of said magnet support in parallel with the lengthwise direction of the linear motor, said stator being held at both ends thereof by stator supports; and a movable body having a hollow member extending in parallel with the lengthwise direction of the linear motor and surrounding part of said stator, and having a plurality of armature modules each of which comprises an armature core and armature coils mounted thereon, said plurality of armature modules being mounted on the inner surface of said hollow member such that the lengthwise axes thereof are in parallel with the lengthwise direction of the linear motor and such that said armature modules respectively face said permanent magnet arrays with an air gap therebetween.

2. The linear motor as claimed in claim 1, wherein said magnet support of said stator is a square tube four magnet arrays on the four outer surfaces of the square tube, and wherein said hollow member of said movable body is another square tube four modules an the four inner surfaces of said another square tube.

3. The linear motor as claimed in claim 1, wherein the armature modules are respectively displaced with each other in the lengthwise direction of the linear motor by a natural number multiple of $\tau/N$, and the permanent magnet arrays are respectively displaced with each other in the lengthwise direction of the linear motor by a natural number multiple of $\tau/N$, where $\tau$ is a pitch of permanent magnets of each of said permanent magnet arrays, and N is a number of permanent magnet arrays.

* * * * *